(12) United States Patent
Hande et al.

(10) Patent No.: US 10,483,858 B2
(45) Date of Patent: *Nov. 19, 2019

(54) SYSTEM AND METHOD FOR STARTING UP A HIGH DENSITY ISOLATED DC-TO-DC POWER CONVERTER

(71) Applicant: ABB Schweiz AG, Baden (CH)

(72) Inventors: Abhiman Ananthakrishna Hande, Plano, TX (US); Jouni Timo Uusitalo, Rockwall, TX (US)

(73) Assignee: ABB SCHWEIZ AG, Baden (CH)

( * ) Notice: Subject to any disclaimer, the term of this patent is extended or adjusted under 35 U.S.C. 154(b) by 0 days.

This patent is subject to a terminal disclaimer.

(21) Appl. No.: 16/260,043

(22) Filed: Jan. 28, 2019

(65) Prior Publication Data

US 2019/0229627 A1 Jul. 25, 2019

Related U.S. Application Data

(63) Continuation of application No. 15/705,827, filed on Sep. 15, 2017, now Pat. No. 10,193,457.

(51) Int. Cl.
*H02M 1/36* (2007.01)
*H02M 3/335* (2006.01)
*H02M 1/08* (2006.01)
*H02M 1/00* (2006.01)

(52) U.S. Cl.
CPC ......... *H02M 3/33523* (2013.01); *H02M 1/08* (2013.01); *H02M 1/36* (2013.01); *H02M 3/33592* (2013.01); *H02M 2001/0006* (2013.01); *H02M 2001/0058* (2013.01)

(58) Field of Classification Search
CPC ............... H02M 1/32; H02M 3/33523; H02M 3/33507; H02M 2001/0032; H02M 2001/0006; Y02B 70/16
USPC ...... 363/16, 17, 21.01, 21.12, 21.16, 49, 65, 363/71, 95, 98; 323/281–288
See application file for complete search history.

(56) References Cited

U.S. PATENT DOCUMENTS

| | | | |
|---|---|---|---|
| 8,520,420 B2 * | 8/2013 | Jungreis | H02M 3/3376 363/17 |
| 9,819,274 B2 * | 11/2017 | Quigley | H02M 1/36 |
| 9,876,434 B2 * | 1/2018 | Torrico-Bascope | H02M 3/33584 |
| 10,305,363 B1 * | 5/2019 | Chen | H02M 1/08 |

(Continued)

*Primary Examiner* — Rajnikant B Patel
(74) *Attorney, Agent, or Firm* — Barnes & Thornburg LLP

(57) ABSTRACT

A DC-to-DC power converter includes a transformer having a primary side and a secondary side, and a primary circuit electrically coupled to the primary side of the transformer. The primary circuit includes a primary microcontroller configured to generate a first energizing signal that energizes a portion of the primary circuit. The DC-to-DC power converter also includes a secondary circuit electrically coupled to the secondary side of the transformer. The secondary circuit includes a secondary microcontroller communicatively coupled to the primary microcontroller, wherein the secondary microcontroller is configured to provide an instruction to the primary microcontroller that causes the primary microcontroller to relinquish control of the primary circuit to the secondary microcontroller, and wherein the secondary microcontroller is further configured to provide a second energizing signal to the portion of the primary circuit.

20 Claims, 3 Drawing Sheets

(56) References Cited

U.S. PATENT DOCUMENTS

2016/0141951 A1\* 5/2016 Mao ........................ H02M 1/36
  363/21.02

\* cited by examiner

SYSTEM AND METHOD FOR STARTING UP A HIGH DENSITY ISOLATED DC-TO-DC POWER CONVERTER

CROSS REFERENCE TO RELATED APPLICATIONS

This application is a continuation of U.S. patent application Ser. No. 15/705,827, filed Sep. 15, 2017, now issued as U.S. Pat. No. 10,193,457, which is incorporated herein by reference in its entirety.

BACKGROUND

The field of disclosure generally relates to a system and method for starting up a DC-to-DC power converter and, more particularly, to a system and method for starting up a high input voltage, high density, isolated DC-to-DC power converter with secondary side control, in which a primary microcontroller disposed within a primary circuit of the converter initiates a start-up sequence, and in which a secondary microcontroller disposed within a secondary circuit of the converter assumes control of the converter upon completion of the start-up sequence.

DC-to-DC power converters are used throughout the electronics industry and are designed to convert an input direct current (DC) voltage to a higher or lower output DC voltage. Such converters may be manufactured on a single printed circuit board (PCB), and board space may be allocated on the PCB to a plurality of converter components. For example, many DC-to-DC power converters implemented on a PCB include a bias voltage generator configured to provide a bias voltage to a microcontroller mounted on the PCB, such as, for example, to power on the microcontroller.

As the electronics and computing industries continue to mature, DC-to-DC power converters capable of handling high input voltages are increasingly in demand, such as, for example, in applications including renewable energy, telecommunications, automotive, and the like. The trend has been to reduce the physical footprint associated with such converters (thus, the term "high density" has come into use). Typically, however, high voltage isolated DC-to-DC power converters may include secondary side control (e.g. PMBus, I2C communication, etc.), which may require the addition of a secondary side microcontroller. To power the secondary side microcontroller, one or more on-board isolated bias supplies (e.g., one or more off-line flyback circuits) may be added to the PCB supporting the converter. However, these bias supplies typically operate at relatively higher voltages and lower frequencies, resulting in substantially larger bias supply form factors.

For example, many typical high voltage flyback bias supplies include, among other components, a high voltage transformer that has a larger form factor (e.g., by comparison to a lower voltage transformer). The larger form factor associated with such bias supplies may, in turn, consume more space than desired on a PCB supporting the DC-to-DC converter. The addition of such bias supplies (e.g., bias supplies having relatively larger form factors) may thus be undesirable, as described above, where board space on the PCB is at a premium, and where it is desirable to package the DC-to-DC converter as compactly as possible.

BRIEF DESCRIPTION

In one aspect, an isolated DC-to-DC power converter is disclosed. The DC-to-DC power converter includes a transformer including a primary side and a secondary side, and a primary circuit electrically coupled to the primary side of the transformer. The primary circuit includes at least one gate driver, a bias voltage generator, and a primary microcontroller electrically coupled to the bias voltage generator and configured to receive a first bias voltage supplied by the bias voltage generator, wherein the primary microcontroller is configured to provide a first energizing signal to at least one gate driver in response to the first bias voltage. The DC-to-DC power converter also includes a secondary circuit electrically coupled to the secondary side of the transformer. The secondary circuit includes a secondary microcontroller communicatively coupled to the primary microcontroller, wherein the secondary microcontroller is configured to receive a second bias voltage, and wherein the secondary microcontroller is further configured to provide a second energizing signal to at least one gate driver in response to the second bias voltage, and wherein the secondary microcontroller is further configured to provide an instruction to the primary microcontroller that causes the primary microcontroller to relinquish control of the primary circuit to the secondary microcontroller.

In another aspect, a DC-to-DC power converter is disclosed. The DC-to-DC power converter includes a transformer including a primary side and a secondary side, and a primary circuit electrically coupled to the primary side of the transformer. The primary circuit includes a primary microcontroller configured to generate a first energizing signal that energizes a portion of the primary circuit. The DC-to-DC power converter also includes a secondary circuit electrically coupled to the secondary side of the transformer. The secondary circuit includes a secondary microcontroller communicatively coupled to the primary microcontroller, wherein the secondary microcontroller is configured to provide an instruction to the primary microcontroller that causes the primary microcontroller to relinquish control of the primary circuit to the secondary microcontroller, and wherein the secondary microcontroller is further configured to provide a second energizing signal to the portion of the primary circuit.

In yet another aspect, method of operating a DC-to-DC power converter is disclosed. The method includes receiving, by a primary microcontroller disposed within a primary circuit of the DC-to-DC power converter, a first bias voltage, generating, by the primary microcontroller and in response to the first bias voltage, a first energizing signal that energizes a portion of the primary circuit, receiving, by the primary microcontroller and from a secondary microcontroller disposed within a secondary circuit of the DC-to-DC power converter, an instruction to relinquish control of the primary circuit to the secondary microcontroller, and transmitting, by the secondary microcontroller, a second energizing signal to the portion of the primary circuit.

DRAWINGS

These and other features, aspects, and advantages of the present disclosure will become better understood when the following detailed description is read with reference to the accompanying drawings in which like characters represent like parts throughout the drawings, wherein.

Figure 1:
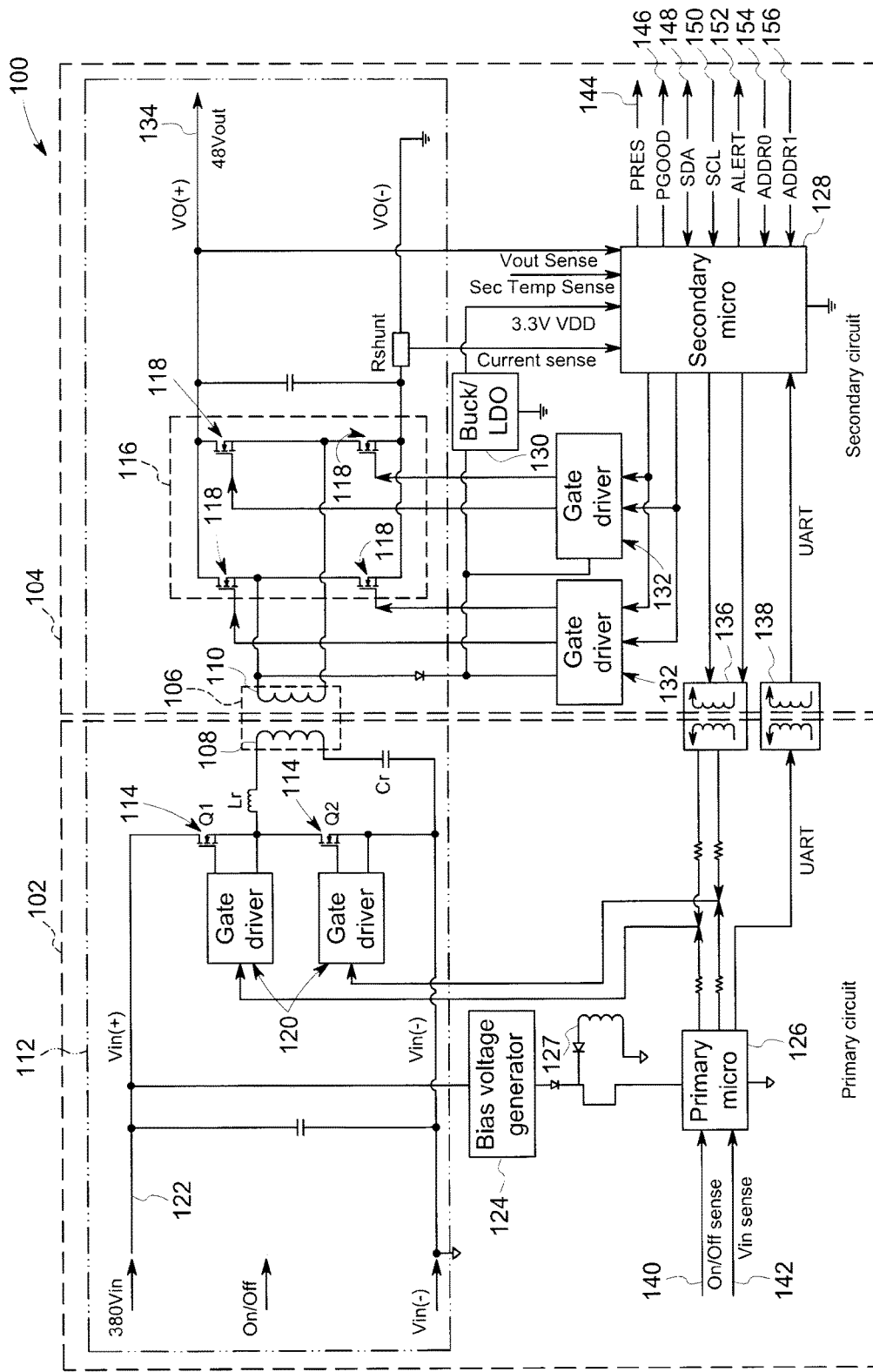
FIG. 1 is a schematic view of an exemplary DC-to-DC converter.

Unless otherwise indicated, the drawings provided herein are meant to illustrate features of embodiments of the disclosure. These features are believed to be applicable in a wide variety of systems comprising one or more embodiments of the disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about" and "substantially", are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

As used herein, the terms "processor," "controller," "microcontroller," "computer," and related terms (e.g., "processing device." "computing device") are not limited to just those integrated circuits referred to in the art as a computer, but broadly refers to a microcontroller, a microcomputer, a programmable logic controller (PLC), an application specific integrated circuit, and other programmable circuits, and these terms are used interchangeably herein. In the embodiments described herein, memory includes, but is not limited to, a computer-readable medium, such as a random access memory (RAM), and a computer-readable non-volatile medium, such as flash memory.

As used herein, the term "non-transitory computer-readable media" is intended to be representative of any tangible computer-based device implemented in any method or technology for short-term and long-term storage of information, such as. computer-readable instructions, data structures, program modules and sub-modules, or other data in any device. Therefore, the methods described herein may be encoded as executable instructions embodied in a tangible, non-transitory, computer readable medium, including, without limitation, a storage device and/or a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the Internet, as well as yet to be developed digital means, with the sole exception being a transitory, propagating signal.

Embodiments of the present disclosure relate to a direct current to direct current (or "DC-to-DC") power converter that facilitates a start-up sequence, in which a primary microcontroller generates a first energizing signal configured to drive the converter and provide secondary bias to a secondary microcontroller, which communicates with the primary microcontroller on completion of the start-up sequence to assume control of the converter. Specifically, the secondary microcontroller may communicate with the primary microcontroller to cause the primary microcontroller to halt generation of the first energizing signal, such that the secondary microcontroller is able to provide a second energizing signal to one or more gate drivers initially powered by the primary microcontroller. In addition, the DC-to-DC converter start up sequence described herein allows exclusion of separate isolated bias voltage generators, such as one or more flyback or flybuck circuits. This improves converter density including for high input voltage applications that employ large, low frequency bias voltage generators such as offline flyback circuits.

FIG. 1 is a schematic view of an exemplary DC-to-DC power converter 100. In the exemplary embodiment, converter 100 includes a primary circuit 102, a secondary circuit 104, and a transformer 106 inductively coupled between primary circuit 102 and secondary circuit 104. Specifically, transformer 106 includes a primary side 108 (or primary winding) to which primary circuit 102 is electrically coupled, and a secondary side 110 (or secondary winding) to which secondary circuit 104 is electrically coupled. As described in greater detail below, converter 100 may be configured as a step-up and/or a step-down power converter. As such, transformer 106 may include any suitable turns ratio, such as, for example any suitable step-up or step-down turns ratio.

Converter 100 also includes a power conversion circuit 112. As described herein, power conversion circuit 112 is configured to convert an input direct current (DC) voltage to an output DC voltage, such as a lower output DC voltage. For example, in some embodiments, power conversion circuit 112 is configured to step an input DC voltage of 380 volts down to an output DC voltage of 48 volts. However, in other embodiments, power conversion circuit 112 may be configured to step any other input DC voltage up or down to any other suitable output DC voltage. Accordingly, converter 100 may function as a step-up and/or a step-down DC-to-DC power converter and may be configured for operation over a range of input DC voltages.

Power conversion circuit 112 may be implemented in any suitable isolated DC-DC converter power conversion topology. For example, power conversion circuit 112 may be implemented as push-pull, half-bridge, full-bridge, forward, flyback, or a resonant topology, such as a series parallel resonant topology (or "LLC" topology), including, for example, resonant half-bridge or full-bridge circuit topologies. As such, power conversion circuit 112 includes transformer 106 that is coupled between primary circuit 102 and secondary circuit 104.

More particularly, on primary side 108 of transformer 106, power conversion circuit 112 may include a plurality of switching elements 114, and on secondary side 110 of transformer 106, power conversion circuit 112 may include a rectifier circuit 116. In the exemplary embodiment, switching elements 114 may include, for example, one or more metal-oxide-semiconductor field-effect transistors ("MOS- FETs"), one or more insulated-gate bipolar transistors ("IGBTs"), and the like. Similarly, rectifier circuit 116 may be configured in any suitable power rectification topology (e.g., as center-tapped, full-bridge, and the like) and may include one or more switching elements 118, such as one or more MOSFETs, one or more IGBTs, and the like. During operation, switching elements 114 may convert an input DC voltage to an alternating current (AC) voltage on primary side 108 of transformer 106, and on secondary side 110 of transformer 106, rectifier circuit 116 may convert an AC voltage induced on secondary side 110 to an output DC voltage.

Primary circuit 102 may also include (in addition to switching elements 114), one or more gate drivers 120, an input voltage bus 122, a bias voltage generator 124, and a primary microcontroller 126. Gate drivers 120 are electrically coupled between primary microcontroller 126 and switching elements 114 and are configured to energize and drive switching elements 114. Accordingly, gate drivers 120 may include, for example, one or more MOSFET drivers, one or more IGBT drivers, and the like.

A bias voltage generator 124 is electrically coupled between input voltage bus 122 and primary microcontroller 126 and is configured to supply a bias voltage to primary microcontroller 126 during a start-up sequence. In the exemplary embodiment, bias voltage generator 124 is a linear regulator, such as, for example, and without limitation, a low-dropout regulator, a fixed regulator, a variable regulator, and/or a series regulator. In addition, in the exemplary embodiment, bias voltage generator 124 is not a bulky low frequency (e.g., 50-100 kHz) bias voltage generator, such as a flyback bias voltage circuit.

In some embodiments, a bias winding 127 may be coupled with the primary side 108 of transformer 106. The bias winding turns off bias from the bias voltage generator 124 (e.g., a linear regulator), and provides bias to primary microcontroller 126 after power up. Inclusion of bias winding 127 improves overall efficiency of the bias voltage generator 124. In addition, primary microcontroller 126 is any suitable microcontroller, such as, for example, any microcontroller including a computer processor coupled to a tangible, non-transitory, computer-readable storage medium and configured to execute instructions stored on the computer-readable storage medium to implement a DC-to-DC power conversion process, as described herein.

On secondary side 110 of transformer 106, secondary circuit 104 includes (in addition to rectifier circuit 116) a secondary microcontroller 128, a step-down power converter 130, one or more gate drivers 132, and an output voltage bus 134. Step-down power converter 130 may include any suitable non-isolated DC-to-DC power converter, such as any suitable buck converter and/or any suitable low-dropout (LDO) converter. In the exemplary embodiment, step-down power converter 130 may be electrically coupled between secondary side 110 of transformer 106 and secondary microcontroller 128 and/or between output voltage bus 134 of converter 100 and secondary microcontroller 128.

Gate drivers 132 are electrically coupled between secondary microcontroller 128 and switching elements 118 and are configured to energize and drive switching elements 118. Accordingly, gate drivers 132 may include, for example, one or more MOSFET drivers, one or more IGBT drivers, and the like. In addition, secondary microcontroller 128 is any suitable microcontroller, such as, for example, any microcontroller including a computer processor coupled to a tangible, non-transitory, computer-readable storage medium and configured to execute instructions stored on the computer-readable storage medium to implement a DC-to-DC power conversion process, as described herein.

In the exemplary embodiment, converter 100 also includes a first isolation circuit 136 (such as a first digital isolator or a first optocoupler) coupled between secondary microcontroller 128 and gate drivers 120 and a second isolation circuit 138 (such as a second digital isolator or a second optocoupler) coupled between primary microcontroller 126 and secondary microcontroller 128. First isolation circuit 136 and second isolation circuit 138 may provide electrical isolation between primary circuit 102 and secondary circuit 104.

Figure 2:
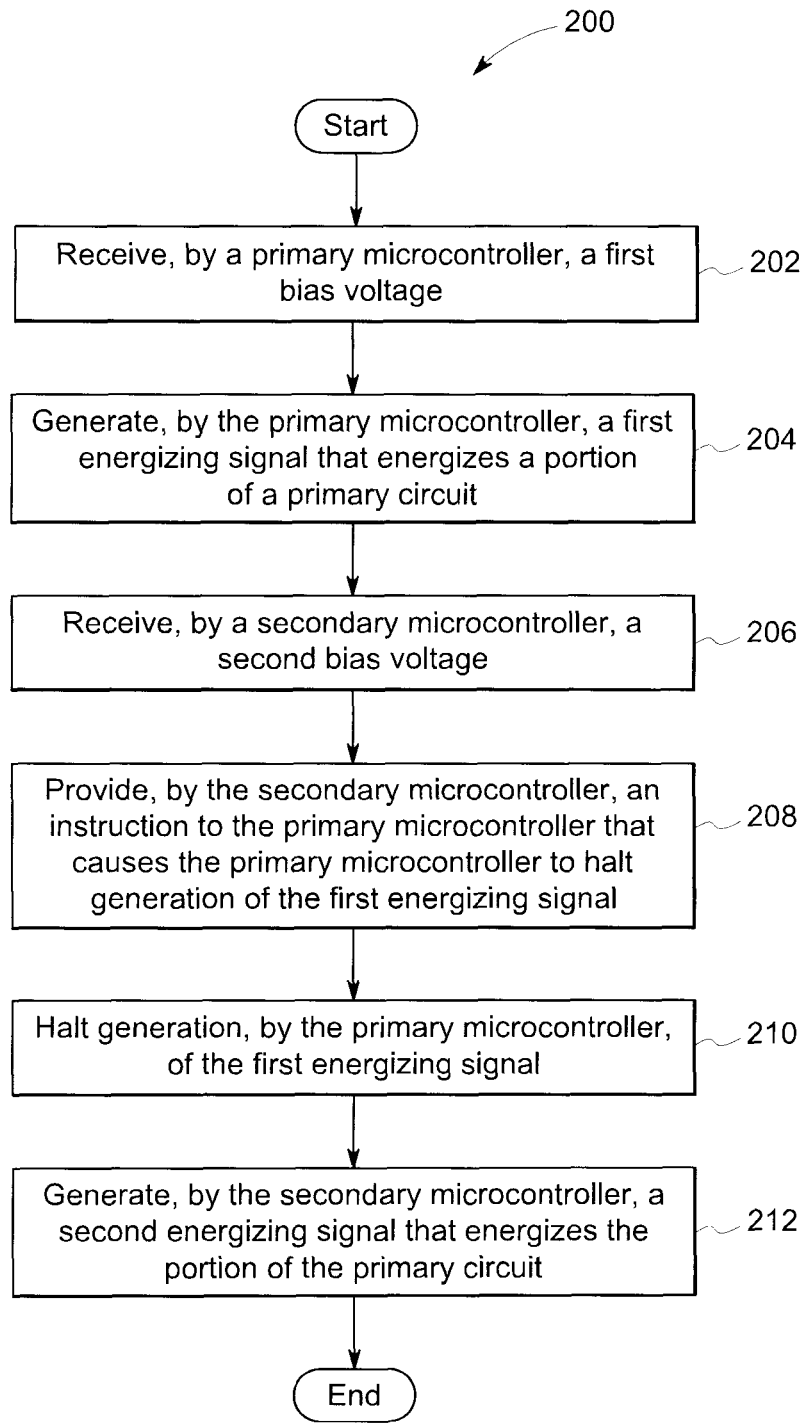
FIG. 2 is a flowchart illustrating an exemplary process for operating the DC-to-DC converter shown in FIG. 1.
Figure 3:
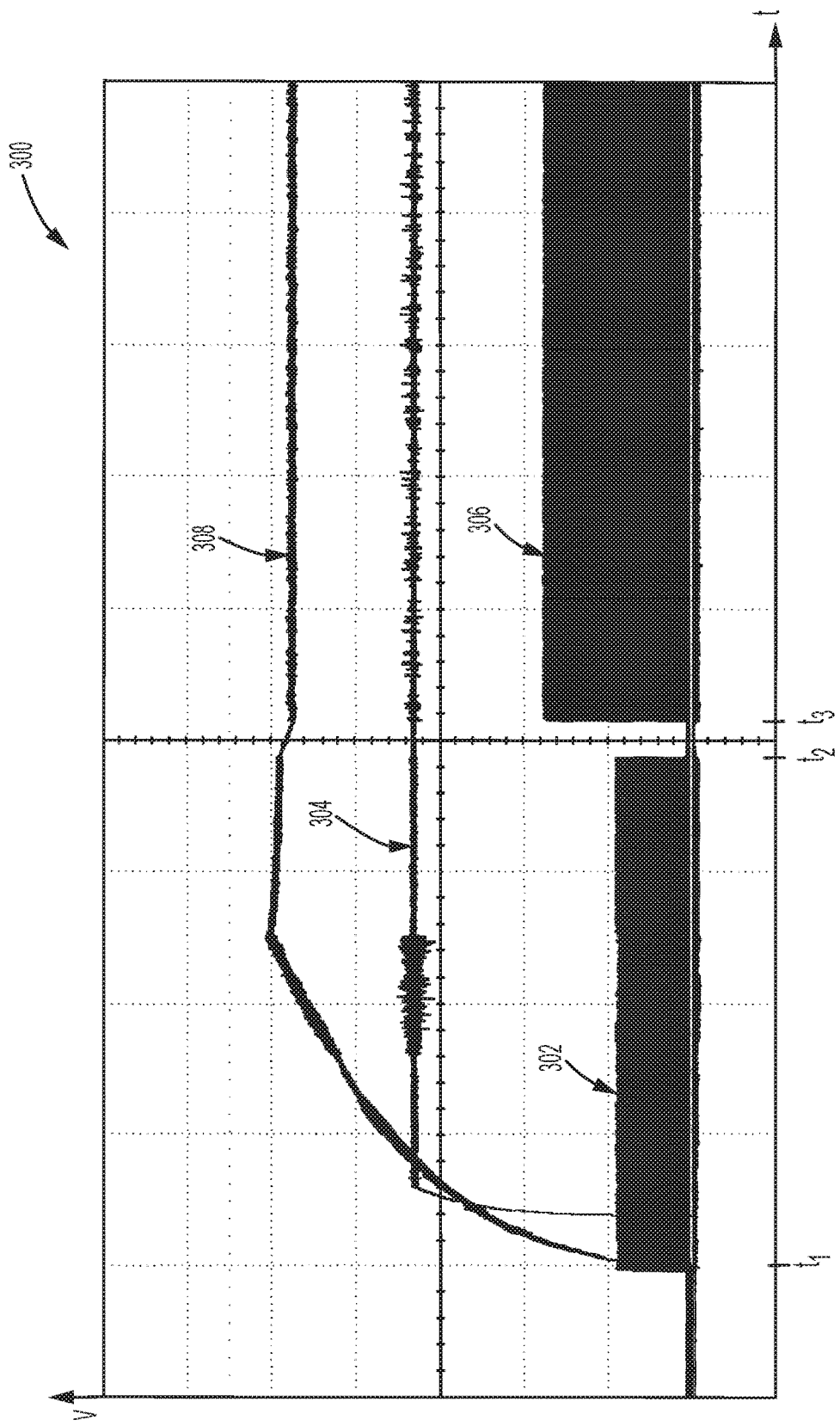
FIG. 3 is a graph illustrating an exemplary voltage response curve generated during a start-up sequence of the DC-to-DC converter shown in FIG. 1.

FIG. 2 is a flowchart illustrating an exemplary process 200 for operating DC-to-DC converter 100 (shown at FIG. 1). FIG. 3 is a graph 300 illustrating an exemplary voltage response curve generated during a start-up sequence of DC-to-DC power converter 100 (shown in FIG. 1).

Accordingly, and with combined reference to FIGS. 2 and 3, process 200 may include a start-up sequence for initializing converter 100 from a powered off state to a powered on state. In the exemplary embodiment, primary microcontroller 126 may receive a bias voltage from bias voltage generator 124 (step 202). The bias voltage may be sufficient to power primary microcontroller 126. For example, the bias voltage provided to primary microcontroller 126 may be approximately 3.3 volts. In addition, primary microcontroller 126 may receive an ON signal 140 and/or an input voltage signal 142, either or both of which may cause primary microcontroller 126 to power on and/or initiate a start-up sequence. Primary microcontroller 126 may periodically measure or sample input voltage sense signal 142, such as in response to a timer interrupt generated by primary microcontroller 126.

In some embodiments, primary microcontroller 126 may determine a temperature of converter 100 and/or a temperature of a portion of converter 100. If the measured temperature is within a predefined range of operating temperatures, primary microcontroller 126 may initiate the start-up sequence; however, if the measured temperature is outside the predefined temperature range, primary microcontroller 126 may postpone the start-up sequence, such as until the measured temperature enters the predefined range.

Once primary microcontroller 126 is powered on and operational, primary microcontroller 126 may generate a first energizing signal 302, which primary microcontroller 126 may provide to gate drivers 120 (step 204). First energizing signal 302 may include a series of fixed frequency, constant on time pulses, and may energize gate drivers 120, which may, in turn, drive power conversion circuit 112. Thus, primary microcontroller 126 may function to initialize power conversion circuit 112, whereupon an output AC voltage (not shown) may be induced on secondary side 110 of transformer 106.

On secondary side of transformer 106 (e.g., within secondary circuit 104), the output AC voltage may be provided to step-down power converter 130, which may rectify and step the output AC voltage down to a DC output voltage 304 suitable for powering secondary microcontroller 128, such as approximately 3.3 volts. Alternately, voltage from output voltage bus 134 of converter 100 may be provided to step-down power converter 130, which may step the output voltage of converter 100 down to DC output voltage 304 suitable for powering secondary microcontroller 128. This DC output voltage 304 may be delivered to secondary microcontroller 128 as a bias voltage. Thus, step-down power converter 130 may generate a bias voltage, such as DC output voltage 304, for powering secondary microcontroller 128 (step 206).

Once powered on, secondary microcontroller 128 may communicate with primary microcontroller 126, such as through second isolation circuit 138. In the exemplary embodiment, communications between primary microcontroller 126 and secondary microcontroller 128 may include any suitable serial communications circuit and/or communications protocol, such as a universal asynchronous receiver/transmitter (UART) circuit. Accordingly, secondary microcontroller 126 may provide an instruction (not shown) to primary microcontroller 126 that causes primary microcontroller 126 to relinquish control of primary circuit 102 to secondary microcontroller 128 (step 208).

In response to receiving the instruction to relinquish control, primary microcontroller 126 may halt generation of first energizing signal 304 (step 210). Specifically, primary microcontroller 126 may power off and/or enter a general purpose input/output (GPIO) state, in which primary microcontroller 126 does not provide first energizing signal 304 to gate drivers 120. In the instance that primary microcontroller 126 powers off, additional power savings may be achieved by converter 100.

After primary microcontroller 126 relinquishes control, secondary microcontroller 128 may generate an energizing signal 306, which may be routed or provided to gate drivers 120 as a second energizing signal (not shown) and to gate drivers 132 as a third energizing signal (not shown) (step 212). The second energizing signal and the third energizing signal may include pulse width modulated (PWM) and/or pulse frequency modulated (PFM) signals. Moreover, the second energizing signal may be routed through first isolation circuit 136 and provided to gate drivers 120 within primary circuit 102. The third energizing signal may be provided to gate drivers 132, which may, in response to receiving the third energizing signal, energize and drive switching elements 118.

Thus, primary microcontroller 126 may initiate operation of converter 100, such as via a start-up sequence, in which primary microcontroller 126 provides first energizing signal 304 to gate drivers 120 until secondary microcontroller 128 powers on. Once secondary microcontroller 128 is powered on, secondary microcontroller 128 communicates with primary microcontroller 126 to provide an instruction to relinquish control of primary circuit 102 (e.g., an instruction to halt generation of first energizing signal 304). In response, primary microcontroller 126 halts generation of first energizing signal 304, and secondary microcontroller 128 assumes control of primary circuit 102, whereby secondary microcontroller 128 provides a second energizing signal (derived from energizing signal 306) to gate drivers 120 within primary circuit 102. In other words, on completion of the start-up sequence, secondary microcontroller 128 assumes control of converter 100. Further, as shown at FIG. 3, an output voltage 308 of converter 100 may be established by primary microcontroller 126 during generation of first energizing signal 304 and continued by secondary microcontroller 128 after primary microcontroller 126 is powered off.

Secondary microcontroller 128 may, in addition, be configured to communicate with an external system, such as an electrical load, coupled to output bus 134 of converter 100. For example, secondary microcontroller 128 may send and/or receive a PRES signal 144, a PGOOD signal 146, an SDA signal 148, an SCL signal 150, an ALERT signal 152, an ADDR0 signal 154, and/or a ADDR1 signal 156. Each signal 144-156 may include status and/or other information associated with converter 100. For instance, PRES signal 144 may provide an indication whether converter 100 is present in its slot, PGOOD signal 146 may provide an indication whether converter 100 is providing (e.g., outputting) power (e.g., whether converter 100 is turned on or turned off), SDA signal 148 and SCL signal 150 may provide indications associated with a serial data line (SDA) and/or a serial clock line (SCL), ALERT signal 152 may provide an indication of any alert conditions associated with converter 100, and ADDR0 signal 154 and ADDR1 signal 156 may be used by the external system to direct communications to secondary microcontroller 328.

Embodiments of the DC-to-DC power converter thus facilitate a start-up sequence in which a primary microcontroller generates a first energizing signal configured to drive the converter circuit, and in which a secondary microcontroller communicates with the primary microcontroller on completion of the start-up sequence to assume control of the converter circuit. Specifically, the secondary microcontroller may communicate with the primary microcontroller to cause the primary microcontroller to halt generation of the first energizing signal, such that the secondary microcontroller is able to provide a second energizing signal to one or more gate drivers initially powered by the primary microcontroller. In addition, the DC-to-DC converter start up sequence described herein allows exclusion of separate isolated bias voltage generators such as flyback or flybuck circuits. This improves converter density including for high input voltage applications that would otherwise employ large, low frequency, bias voltage generators, such as off line flyback circuits.

Exemplary technical effects of the DC-to-DC power converter described herein include, for example: (a) removal at a design stage of separate bias voltage circuits from the converter; (b) a start-up sequence involving a handshaking sequence of two microcontrollers on either side of the isolation boundary (primary microcontroller coupled on a primary side of a converter transformer and secondary microcontroller residing on a secondary side of the converter transformer); and (c) enabling high density isolated DC-DC conversion in applications requiring secondary side control.

Exemplary embodiments of a DC-to-DC power converter and related components are described above in detail. The converter is not limited to the specific embodiments described herein, but rather, components of systems and/or steps of the methods may be utilized independently and separately from other components and/or steps described herein. For example, the configuration of components described herein may also be used in combination with other processes, and is not limited to practice with the systems and related methods as described herein. Rather, the exemplary embodiment can be implemented and utilized in connection with many applications where DC-to-DC power conversion is desired.

Although specific features of various embodiments of the present disclosure may be shown in some drawings and not in others, this is for convenience only. In accordance with the principles of the present disclosure, any feature of a drawing may be referenced and/or claimed in combination with any feature of any other drawing.

This written description uses examples to disclose the embodiments of the present disclosure, including the best mode, and also to enable any person skilled in the art to practice the disclosure, including making and using any devices or systems and performing any incorporated methods. The patentable scope of the embodiments described herein is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A DC-to-DC power converter comprising:
   a transformer comprising a primary side and a secondary side;
   a primary circuit electrically coupled to the primary side of the transformer, the primary circuit comprising (i) at least one gate driver, (ii) a bias voltage generator, and (iii) a primary microcontroller electrically coupled to the bias voltage generator and configured to receive a first bias voltage supplied by the bias voltage generator, the primary microcontroller configured to provide a first energizing signal to the at least one gate driver in response to the first bias voltage; and
   a secondary circuit electrically coupled to the secondary side of the transformer, the secondary circuit comprising a secondary microcontroller communicatively coupled to the primary microcontroller, the secondary microcontroller configured to receive a second bias voltage caused by the first energizing signal, the secondary microcontroller further configured to provide, in response to the second bias voltage, a second energizing signal to the at least one gate driver in response to the second bias voltage, the secondary microcontroller further configured to provide, in response to the second bias voltage, an instruction to the primary microcontroller that causes the primary microcontroller to relinquish control of the primary circuit to the secondary microcontroller.

2. The DC-to-DC power converter of claim 1, wherein the secondary circuit further comprises a step-down converter electrically coupled between at least one of (i) the secondary side of the transformer and the secondary microcontroller and (ii) an output voltage bus of the DC-to-DC power converter and the secondary microcontroller, the step-down converter arranged to generate the second bias voltage.

3. The DC-to-DC power converter of claim 1, further comprising a first isolation circuit coupled between the primary microcontroller and the secondary microcontroller, the secondary microcontroller configured to route the second energizing signal to the at least one gate driver through the first isolation circuit.

4. The DC-to-DC power converter of claim 1, further comprising a second isolation circuit coupled between the primary microcontroller and the secondary microcontroller, the secondary microcontroller configured to route the instruction to relinquish control of the primary circuit through the second isolation circuit.

5. The DC-to-DC power converter of claim 1, wherein the secondary circuit further comprises a rectifier circuit electrically coupled between the secondary side of the transformer and an output voltage bus.

6. The DC-to-DC power converter of claim 1, further comprising a bias winding coupled to the bias voltage generator.

7. The DC-to-DC power converter of claim 1, wherein the first energizing signal is a series of fixed frequency, constant on-time pulses, and wherein the second energizing signal is at least one of (i) pulse width modulated (PWM) signals and (ii) pulse frequency modulated (PFM) signals.

8. The DC-to-DC power converter of claim 1, wherein the bias voltage generator is a linear regulator selected form the group consisting of a low-dropout regulator, a fixed regulator, a variable regulator, and a series regulator.

9. A DC-to-DC power converter comprising:
   a transformer comprising a primary side and a secondary side;
   a primary circuit electrically coupled to the primary side of the transformer, the primary circuit including a primary microcontroller configured to generate a first energizing signal that energizes a portion of the primary circuit; and
   a secondary circuit electrically coupled to the secondary side of the transformer, the secondary circuit including a secondary microcontroller communicatively coupled to the primary microcontroller, the secondary microcontroller configured to provide, in response to a bias voltage caused by the first energizing signal, an instruction to the primary microcontroller that causes the primary microcontroller to relinquish control of the primary circuit to the secondary microcontroller, the secondary microcontroller further configured to provide a second energizing signal to the portion of the primary circuit.

10. The DC-to-DC power converter of claim 9, wherein the secondary circuit further includes a step-down converter electrically coupled between the secondary side of the transformer and the secondary microcontroller, the step-down converter configured to step an output voltage induced in the secondary side of the transfer down to the bias voltage.

11. The DC-to-DC power converter of claim 9, further comprising a first isolation circuit coupled between the primary microcontroller and the secondary microcontroller, the secondary microcontroller configured to provide the second energizing signal to the portion of the primary circuit through the first isolation circuit.

12. The DC-to-DC power converter of claim 9, further comprising a second isolation circuit coupled between the primary microcontroller and the secondary microcontroller, the secondary microcontroller configured to route the instruction to relinquish control of the primary circuit through the second isolation circuit.

13. The DC-to-DC power converter of claim 9, wherein the secondary circuit further comprises a rectifier circuit electrically coupled between the secondary side of the transformer and an output voltage bus.

14. The DC-to-DC power converter of claim 9, further comprising a bias voltage generator and a bias winding, the bias voltage generator electrically coupled to the primary microcontroller through the bias winding.

15. The DC-to-DC power converter of claim 9, wherein the first energizing signal is a series of fixed frequency, constant on time pulses, and wherein the second energizing signal is at least one of i) pulse width modulated (PWM) signals and ii) pulse frequency modulated (PFM) signals.

16. A method of operating a DC-to-DC power converter, the method comprising:
   receiving, by a primary microcontroller disposed within a primary circuit of the DC-to-DC power converter, a first bias voltage;
   generating, by the primary microcontroller and in response to the first bias voltage, a first energizing signal that energizes a portion of the primary circuit;
   sending, by a secondary microcontroller disposed within a second circuit and in response to a bias voltage caused by the first energizing signal, an instruction to the primary microcontroller to relinquish control of the primary circuit to the secondary microcontroller;

receiving, by the primary microcontroller, the instruction to relinquish control of the primary circuit to the secondary microcontroller; and transmitting, by the secondary microcontroller, a second energizing signal to the portion of the primary circuit.

17. The method of claim 16, further comprising receiving, by the secondary microcontroller, the bias voltage from a non-isolated step-down converter coupled to a secondary side of a transformer, the transformer coupled between the primary circuit and the secondary circuit.

18. The method of claim 17, further comprising routing, by the secondary microcontroller, the second energizing signal to the portion of the primary circuit through a first digital isolator coupled between the primary circuit and the secondary circuit.

19. The method of claim 18, further comprising routing, by the secondary microcontroller, the instruction to relinquish control of the primary circuit through a second digital isolator coupled between the primary circuit and the secondary circuit.

20. The method of claim 17, further comprising routing, by the secondary microcontroller, the second energizing signal to the portion of the primary circuit through a first optocoupler coupled between the primary circuit and the secondary circuit.

\* \* \* \* \*